United States Patent
Bödiger et al.

(10) Patent No.: US 6,815,524 B1
(45) Date of Patent: Nov. 9, 2004

(54) POLYCARBONATE SUBSTRATES

(75) Inventors: Michael Bödiger, League City, TX (US); Steffen Kühling, Meerbusch (DE); Franky Bruynseels, Sint-Gillis-Waas (BE); Dirk van Meirvenne, Chonburi (TH); Renë de Cleyn, Wuustwezel (BE)

(73) Assignees: Bayer Aktiengesellschaft, Leverkusen (DE); Bayer Antwerpen N.V., Antwerpen (BE)

( * ) Notice: Subject to any disclaimer, the term of this patent is extended or adjusted under 35 U.S.C. 154(b) by 0 days.

(21) Appl. No.: 10/112,000

(22) PCT Filed: Oct. 23, 2000

(86) PCT No.: PCT/EP00/10399
§ 371 (c)(1),
(2), (4) Date: Aug. 5, 2002

(87) PCT Pub. No.: WO01/32778
PCT Pub. Date: May 10, 2001

(30) Foreign Application Priority Data

Nov. 3, 1999 (DE) .......................... 199 52 850

(51) Int. Cl.$^7$ ................................................ C08G 64/00
(52) U.S. Cl. .................... 528/198; 428/411.1; 428/412; 528/196
(58) Field of Search .............................. 428/411.1, 412; 528/196, 198

(56) References Cited

U.S. PATENT DOCUMENTS 6,248,469 B1 * 6/2001 Formato et al. ............... 429/41

FOREIGN PATENT DOCUMENTS

| EP | 0 380 002 | 8/1990 |
| EP | 0 246 885 | 1/2000 |
| JP | 7-196783 | 8/1995 |

* cited by examiner

Primary Examiner—Terressa Boykin
(74) Attorney, Agent, or Firm—Joseph C. Gil; Aron Preis

(57) ABSTRACT

Polycarbonate substrates having low concentration of defects are disclosed. The substrates are suitable for producing molded articles characterized by low cloudiness.

4 Claims, No Drawings

POLYCARBONATE SUBSTRATES

The invention provides polycarbonate substrates and their use for preparing moulded items with especially high purity and extremely high surface brilliance and the moulded items which can be prepared from the polycarbonate substrate.

For certain moulded items such as in particular glazing for motor vehicles and headlamps, glazing of other types such as so-called twin-wall sheets or hollow chamber sheets or solid sheets, high purity polycarbonate is required.

Polycarbonate is prepared by the so-called phase boundary process in which dihydroxydiarylalkanes, in the form of their alkali metal salts, are reacted with phosgene in heterogeneous phase in the presence of inorganic bases such as sodium hydroxide solution and an organic solvent in which the product polycarbonate is very soluble. During reaction, the aqueous phase is distributed within the organic phase and after reaction the organic polycarbonate-containing phase is washed with an aqueous liquid, wherein, inter alia, electrolytes are removed and the wash liquid is then separated.

In order to wash the polycarbonate-containing solution, EP-A-264 885 suggests stirring up the aqueous wash liquid with the polycarbonate solution and separating the aqueous phase by centrifuging.

Japanese application JP-A-07 19 67 83 describes a process for preparing polycarbonate in which the concentration of iron in the sodium hydroxide solution used is intended to be less than 2 ppm, in order to produce favourable colour characteristics.

The object of the present invention is the provision of an alternative and improved process for preparing pure polycarbonate substrates and the provision of polycarbonate moulded items with especially high purity and high surface brilliance.

Surprisingly, it has now been found that polycarbonate moulded items with especially high purity and high surface brilliance are obtained from polycarbonate substrates which are prepared by a special process.

Therefore, the application provides polycarbonate substrates with a low concentration of foreign particles and the polycarbonate moulded items with high surface brilliance prepared therefrom which are obtained by a process for preparing polycarbonate by the phase boundary method which is characterised in that, from the group of feedstocks, at least the feedstock sodium hydroxide solution contains very little Fe, Cr, Ni, Zn, Ca, Mg, Al or their chemical homologues.

The application therefore provides a process for preparing polycarbonate by the phase boundary process, wherein dihydroxydiarylalkanes in the form of their alkali metal salts are reacted with phosgene in heterogeneous phase in the presence of sodium hydroxide solution and an organic solvent, characterised in that a) the feedstocks are low in the metals Fe, Cr, Ni, Zn, Ca, Mg, Al or their homologues b) the organic solvent is separated off and c) the polycarbonate obtained is worked up.

In the context of the invention, low in the metals mentioned or their chemical homologues means that preferably not more than 2 ppm, more preferably not more than 1 ppm and particularly preferably not more than 0.5 ppm and very particularly preferably not more than 0.2 ppm of total metal, in particular of the metals listed above and their homologues is contained in the feedstocks. These limiting values do not apply to the alkali metals.

It is intended that the feedstock sodium hydroxide solution should preferably be low in the metals mentioned. In particular, with reference to a 100 wt. % strength NaOH concentration, the sodium hydroxide solution should contain not more than 1 ppm, preferably not more than 0.5 ppm, more preferably not more than 0.3 ppm of alkaline earth metals or their homologues. In particular, with reference to a 100 wt. % strength NaOH concentration, the feedstock sodium hydroxide solution should contain not more than 1 ppm, advantageously not more than 0.5 ppm, preferably not more than 0.1 ppm of iron.

The sodium hydroxide solution is preferably used in the process according to the invention as a 20–55 wt. % strength, particularly preferably a 30–50 wt. % strength solution.

Sodium hydroxide solution with the limiting values mentioned above is obtainable by membrane processes known from the literature.

In a preferred embodiment, in addition to the sodium hydroxide solution, the feedstocks bisphenol, in particular bisphenol and water, very particularly preferably bisphenol, water and the organic solvent are low in metals, in particular low in Fe, Cr, Ni, Zn, Ca, Mg, Al or their chemical homologues.

Embodiments in which a sodium bisphenolate (solution) has been previously prepared from sodium hydroxide solution and bisphenol(s) are also included.

These feedstocks which are low in metal are obtained, in a preferred variant, by distilling the solvent, crystallising the bisphenol, preferably crystallising or distilling the bisphenol several times and using the water in a fully deionised quality.

The fully deionised water is preferably desalted, degassed and/or desilicified. The electrical conductivity (sum parameter for ionogenic substances from salts which are still present in trace amounts in the water) is used as a quality criterion, wherein in the process according to the invention the fully deionised water is characterised by an electrical conductivity of 0.2 $\mu$S/cm (DIN 38404 C 8) and a $SiO_2$ concentration of 0.02 mg/kg (VGB 3.3.1.1), or less than each of these.

The concentration of dissolved oxygen in the fully deionised water is advantageously less than 1 ppm, preferably less than 100 ppb. This oxygen concentration is preferably applied to all starting substances and process steps.

In a further preferred embodiment, from among the group of feedstocks, at least the sodium hydroxide solution, preferably also the bisphenol, particularly preferably the sodium hydroxide solution, the bisphenol and the water, most preferably the sodium hydroxide solution, the bisphenol, the water and the organic solvent are filtered once, preferably twice, particularly preferably three times step-wise, before the start of reaction.

The invention also provides a process for preparing polycarbonate by the phase boundary process, wherein dihydroxydiarylalkanes in the form of their alkali metal salts are reacted with phosgene in heterogeneous phase in the presence of sodium hydroxide solution and an organic solvent, characterised in that a) the feedstocks are low in the metals Fe, Cr, Ni, Zn, Ca, Mg, Al or their homologues b) the aqueous phase being produced during reaction is separated and the separated organic polycarbonate phase is washed with an aqueous liquid and c) the washed, and separated from the wash liquid, organic polycarbonate phase, optionally after filtration, is heated and filtered hot at least once;

d) the organic solvent is separated off and e) the polycarbonate obtained is worked up.

In a preferred embodiment, in process step d), the reaction mixture is filtered directly after reaction and/or the organic polycarbonate phase obtained and separated is filtered and/or the organic polycarbonate phase separated in process step e) is filtered.

Preferably at least two of these filtration procedures, in particular all three filtration procedures, are performed.

In a preferred variant, in particular in the case of hot filtration, the mixture is filtered at least once, preferably twice, particularly preferably at least three times, in particular step-wise. In the case of step-wise filtration, coarser filters are used first and then these are replaced by finer filters. The filtration procedure for the two-phase media in process step d) is preferably performed with coarse filters.

In process step e), filters with smaller pore sizes are used for hot filtration. In this case it is important that the polycarbonate phase is present as the most homogeneous solution possible. This is achieved by heating the organic polycarbonate phase, which generally still contains residues of aqueous wash liquid. The wash liquid then dissolves and a clear solution is produced. The previously dissolved contaminants, in particular dissolved alkali metal salts, precipitate out and can be filtered off In order to achieve a homogeneous solution, the well-known freezing out method may be used in addition to the method described above.

To perform filtration in accordance with the invention, membrane filters and sintered metal filters or also bag filters may be used as filters. The pore size of the filters is generally 0.01 to 5 μm, preferably 0.02 to 1.5 μm, more preferably 0.05 to 1.0 μm. These types of filters are commercially available, for example from Pall GmbH, D-63363 Dreieich, and Krebsböge GmbH, D-42477 Radevormwald (SIKA-R CU1AS type).

Greatly improved filter lifetimes are obtained by the combination in the process according to the invention.

Performing the other process steps is generally well-known. Thus, the aqueous phase is emulsified in the organic phase during reaction. Droplets of differing sizes are then produced. After reaction, the organic polycarbonate-containing phase is normally washed several times with an aqueous liquid and separated as far as possible from the aqueous phase after each wash process. Washing is preferably performed with very finely filtered water which has a very low metal content. The polymer solution is normally cloudy after washing and separation of the wash liquid. The wash liquids used are aqueous liquids, a dilute inorganic acid such as HCl or $H_3PO_4$ to separate the catalyst, and fully deionised water for further purification. The concentration of HCl or $H_3PO_4$ in the wash liquid may be, for example, 0.5 to 1.0 wt. %. The organic phase is washed, for example and preferably, five times.

Well-recognised separating funnels, phase separators, centrifuges or coalescers or also combinations of these devices may be used as phase separation devices to separate the wash liquid from the organic phase.

The solvent is evaporated off to obtain the high purity polycarbonate. Evaporation may take place in several evaporation stages. In accordance with a further preferred embodiment of this invention, the solvent or some of the solvent is removed by spray drying. The high purity polycarbonate is then obtained as a powder. The same applies to recovering the high purity polycarbonate by precipitation from the organic solution and then removing residues by drying. Extrusion, for example, is a suitable means of evaporating residual solvent. Extrusion-evaporation technology is another means.

Compounds which are preferably used as feedstocks are bisphenols of the general formula HO-Z-OH, in which Z is an organic group with 6 to 30 carbon atoms, which contain one or more aromatic groups. Examples of such compounds are bisphenols which belong to the group of dihydroxyphenyls, bis(hydroxyphenyl)alkanes, indanebisphenols, bis(hydroxyphenyl)ethers, bis(hydroxyphenyl)sulfones, bis(hydroxyphenyl)ketones and α,α'-bis(hydroxyphenyl)diisopropylbenzenes.

Particularly preferred bisphenols which belong to the previously mentioned group of compounds are 2,2-bis-(4-hydroxyphenyl)-propane (BPA/bisphenol-A), tetraalkyl-bisphenol-A, 4,4-(meta-phenylenediisopropyl)-diphenol (bisphenol M), 1,1-bis-(4-hydroxyphenyl)-3,3,5-trimethylcyclohexanone and optionally mixtures of these. Particularly preferred copolycarbonates are those based on monomeric bisphenol-A and 1,1-bis-(4-hydroxyphenyl)-3,3,5-trimethylcyclohexane. The bisphenol compounds to be used according to the invention are reacted with carbonic acid compounds, in particular phosgene.

Polyestercarbonates are obtained by reaction of the bisphenols already mentioned, at least one aromatic dicarboxylic acid and optionally carbon dioxide. Suitable aromatic dicarboxylic acids are, for example, orthophthalic acid, terephthalic acid, isophthalic acid, 3,3'- or 4,4'-diphenyldicarboxyilic acid and benzophenonedicarboxylic acid.

Inert organic solvents used in the process are, for example, dichloromethane, the various dichloroethanes and chloropropane compounds, chlorobenzene and chlorotoluene. Dichloromethane and mixtures of dichloromethane and chlorobenzene are preferably used.

The reaction can be accelerated by catalysts such as tertiary amines, N-alkylpiperidines or onium salts. Tributylamine, triethylamine and N-ethylpiperidine are preferably used. A monofunctional phenol such as phenol, cumylphenol, p-tert.-butylphenol or 4-(1,1,3,3-tetramethylbutyl)phenol may be used as chain terminators and molecular weight regulators. Isatin-biscresol, for example, may be used as a branching agent.

To prepare high purity polycarbonates, the bisphenols are dissolved in an aqueous alkaline phase, preferably sodium hydroxide solution. The chain terminators optionally required for preparing copolycarbonates are dissolved in the aqueous alkaline phase or added to this as such in an inert organic phase in amounts of 1.0 to 20.0 mol % per mole of bisphenol. Then phosgene is passed into the mixer which contains the remainder of the reaction constituents and polymerisation is performed.

Optionally used chain terminators are either monophenols or monocarboxylic acids. Suitable monophenols are phenol itself, alkyl phenols such as cresols, p-tert.-butylphenol, p-cumylphenol, p-n-octylphenol, p-iso-octylphenol, p-n-nonylphenol and p-iso-nonylphenol, halophenols such as p-chlorophenol, 2,4-dichlorophenol, p-bromophenol and 2,4,6-tribromophenol and mixtures of these.

Suitable monocarboxylic acids are benzoic acid, alkyl-benzoic acids and halobenzoic acids.

Preferred chain terminators are phenols of the formula (I)

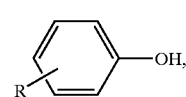

(I)

in which

R is hydrogen, tert.-butyl or a branched or unbranched $C_8$ and/or $C_9$ alkyl group.

Preferred chain terminators are phenol and p-tert.-butylphenol.

The amount of chain terminator to be used is 0.1 mol % to 5 mol %, with respect to moles of each of the diphenols used. The addition of a chain terminator may take place before, during or after phosgenation.

Optionally, a branching agent may also be added to the reaction. Preferred branching agents are the trifunctional or more than trifunctional compounds known from polycarbonate chemistry, in particular those with three or more than three phenolic OH groups.

Branching agents are also, for example and preferably, phloroglucine, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-bis-(2-hydroxy-5'-methylbenzyl)-4-methylphenol, 2-(4-hydroxyphenyl)-2-(2,4-dihydroxyphenyl)-propane, esters of hexa-(4-(4-hydroxyphenyl-isopropyl)-phenyl)-orthoterephthalic acid, tetra-4-hydroxyphenyl)-methane, tetra-(4-(4-hydroxyphenyl-isopropyl)-phenoxy)-methane and 1,4-bis-(4',4"-dihydroxytriphenyl)-methyl)-benzene and also 2,4-dihydroxybenzoic acid, trimesic acid, cyanuric chloride and 3,3-bis-(3-methyl-4-hydroxyphenyl)-2-oxo-2,3-dihydroindole.

The amount of optionally used branching agent is 0.05 mol % to 2 mol %, again with respect to moles of each of the diphenols used.

The branching agent may be either initially introduced in the aqueous alkaline phase with the diphenols and the chain terminators, or added before phosgenation dissolved in an organic solvent.

Some, up to 80 mol %, preferably 20 to 50 mol %, of the carbonate groups in the polycarbonates may be replaced by aromatic dicarboxylic ester groups.

Polycarbonates according to the invention are either homopolycarbonates or copolycarbonates and mixtures of these. Polycarbonates according to the invention may be aromatic polyestercarbonates or polycarbonates which are present in a mixture with aromatic polyestercarbonates. The expression polycarbonate is regarded as representing the polycarbonate substrate obtainable by the process according to the invention.

Polycarbonates according to the invention have average molecular weights $M_w$ (determined by measuring the relative viscosity at 25° C. in dichloromethane and at a concentration of 0.5 g of polycarbonate per 100 ml of dichloromethane) of 12,000 to 400,000, preferably 23,000 to 80,000 and in particular 24,000 to 40,000.

Moulded items according to the invention which can be made from the high purity polycarbonate according to the invention are in particular glazing for motor vehicles and headlamps, glazing of other types such as for greenhouses, so-called twin-walled sheets or hollow chamber sheets or solid sheets. These moulded items are prepared by known methods such as e.g. injection moulding, extrusion and extrusion blow moulding processes using polycarbonates according to the invention.

Moulded items produced from polycarbonates according to the invention have a particularly low number, fewer than 250, preferably fewer than 150, of defects per m² measured on a 200 µm extruded film.

The advantage of moulded items according to the invention, in particular for solid sheets and twin-walled sheets, is their extremely low number of optically detectable surface defects and their outstanding brilliance.

Another advantage of moulded items according to the invention, in for particular discs and headlamp diffusers, is the low cloudiness of less than 0.5%, in particular less than 0.4%, associated with long-term durability.

The following examples are used to explain the invention. The invention is not restricted to these examples.

EXAMPLES

Example 1

To prepare the polycarbonate, BPA (BPA, as a melt, is continuously brought into contact with sodium hydroxide solution) is mixed with sodium hydroxide solution with the exclusion of oxygen. The sodium hydroxide solution used has different concentrations and purities (see table 1), wherein the original sodium hydroxide solution is diluted still further to a 6.5% strength sodium hydroxide solution, using filtered fully deionised water, in order to dissolve the bisphenols. This sodium bisphenolate solution is now filtered (0.6 µa filter) and used in the polycarbonate reaction. After reaction, the reaction solution is filtered through a 1.0 µnom bag filter and taken to a wash procedure. Here, the mixture is washed with 0.6% strength hydrochloric acid and then post-washed another S times using filtered fully deionised water. The organic solution is separated from the aqueous solution and, after heating the organic solution to 55° C., it is filtered first with a 0.6 µa filter and then through a 0.2 µa filter. After isolation, poly-2,2-bis-(4-hydroxyphenyl)-propane-carbonate is obtained. The polycarbonate obtained has an average molecular weight $M_w$ of 31,000.

TABLE 1

| Quality of sodium hydroxide solution | | | |
|---|---|---|---|
| | 1 | 2 | 3 |
| % NaOH | 50 | 50 | 32 |
| Fe (ppm) | 0.7 | 0.46 | 0.02 |
| Ca (ppm) | 2.0 | 0.4 | <0.1 |
| Mg (ppm) | 0.5 | 0.2 | <0.1 |
| Ni (ppm) | 0.2 | 0.2 | <0.01 |
| Cr (ppm) | 0.4 | 0.25 | <0.01 |
| Zn (ppm) | 0.1 | 0.05 | 0.06 |
| Total (ppm) | 3.9 | 1.56 | <0.3 |
| Conc. in 100% NaOH | | | |
| Fe (ppm) | 1.4 | 0.9 | 0.06 |
| Ca (ppm) | 4.0 | 0.8 | <0.3 |
| Mg (ppm) | 1.0 | 0.4 | <0.3 |
| Ni (ppm) | 0.4 | 0.4 | <0.03 |
| Cr (ppm) | 0.8 | 0.5 | <0.03 |
| Zn (ppm) | 0.2 | 0.1 | 0.19 |
| Total (ppm) | 7.8 | 3.1 | <0.9 |

The filter lifetimes for various filter locations are, for individual cases:

TABLE 2

| | Sodium hydroxide prepared from trial no. | | |
|---|---|---|---|
| Filter lifetimes | 1 | 2 | 3 |
| Before reaction 0.6 µa filter | 12 h | 10 d | 30 d |
| After reaction 1.0 µa filter | 24 h | 30 d | >60 d |
| Final filter 1 = 0.6 µa filter | 12 h | 3 d | 21 d |
| Final filter 2 = 0.2 µa filter | | | |

Films are now extruded from the polycarbonates prepared with sodium hydroxide solution from trials 1 to 3 and these are subjected to a film laser scan test using the known method which is described below.

The extruded film is 200 μm thick and 60 mm wide. A He/Ne laser ("spot diameter" of 0.1 mm) scans the film with a scan frequency of 5000 Hz across the width and with a rate of transport of 5 m/s in the longitudinal direction. All defects which cause scattering of the transmitted laser beam (from 0.10 mm diameter upwards) are detected by a photomultiplier and counted using a software package. The number of optical defects per kg of polycarbonate or per m² of film is a measure of the surface quality of these films and the purity of the PCs.

Evaluating the extruded film with a laser scanner

| # per m² of surface | PC prepared using sodium hydroxide soln. from trial no. | | |
|---|---|---|---|
| | 1 | 2 | 3 |
| 0.10–0.30 mm | 148 | 93 | 35 |
| >0.30 mm | 232 | 132 | 41 |
| Total | 380 | 225 | 76 |

Colour sample platelets are produced from the polycarbonates of different qualities. The colour sample platelets had, according to ASTM D1003, different cloudiness values, wherein the colour sample platelet (4 mm thick) which had been produced with polycarbonates prepared from sodium hydroxide solution from trial 3 had a particularly low cloudiness of 0.38%, which leads to less diffuse light scattering when used as glazing/headlamp diffusers.

What is claimed is:

1. Polycarbonate substrates with a concentration of optically detectable surface defects that is fewer than 250 defects per m², measured on an extruded film of 200 μm in thickness.

2. Polycarbonate substrates with a concentration of optically detectable surface defects that is fewer than 150 defects per m², measured on an extruded film of 200 μm in thickness.

3. A polycarbonate substrate having a concentration of optically detectable surface defects lower than 250 defects per m², as measured on an extruded film of 200 μm in thickness, the polycarbonate having being prepared by the phase boundary process wherein feedstocks are characterized by their low concentration of FE, Cr, Ni, Zn, Ca, Mg, Al and their homologues.

4. The substrate of claim 3 wherein the concentration of optically detectable surface defects is lower than 150 defects per m², as measured on an extruded film of 200 μm in thickness.

* * * * *